United States Patent [19]

Butler

[11] Patent Number: 4,716,980

[45] Date of Patent: Jan. 5, 1988

[54] CONTROL SYSTEM FOR RIDER VEHICLES

[75] Inventor: Robert W. Butler, Rural Letts, Iowa

[73] Assignee: The Prime Mover Company, Muscatine, Iowa

[21] Appl. No.: 830,520

[22] Filed: Feb. 14, 1986

[51] Int. Cl.$^4$ ............................................. B62D 51/04
[52] U.S. Cl. ................................. 180/19.2; 180/65.1; 180/315; 180/321; 188/110; 188/173; 188/341
[58] Field of Search ...................... 180/19.3, 272, 273, 180/65.1, 315, 318, 320, 321, 322, 332, 19.1, 19.2; 188/74, 341, 109, 110, 171, 173

[56] References Cited

U.S. PATENT DOCUMENTS

| | | | |
|---|---|---|---|
| 1,911,872 | 5/1933 | Bacon | 180/318 |
| 3,724,586 | 4/1973 | Goodacre | 180/19.1 |
| 3,738,441 | 6/1973 | Kemner | 180/65.1 |

OTHER PUBLICATIONS

Brochures for Crown Rider Pallet Trucks or Tow Tractors, 1981.

Barrett Double Pallett Truck brochure "Bulletin 1079"-undated.

Primary Examiner—John J. Love
Assistant Examiner—Eric Culbreth
Attorney, Agent, or Firm—Neuman, Williams Anderson & Olson

[57] ABSTRACT

An electric rider vehicle control system is disclosed which includes a dead man brake that is normally set to prevent coasting, and controls which release the brake and permit normal transport operation of the vehicle at multiple speeds by an operator on the operator's platform. The controls also include a selector switch for selecting between such normal operation and another mode in which the brake is held in a release position by an electrical solenoid, the first controls are disabled or bypassed, and the propulsive drive is operated by jogging control switches mounted on the sides of the vehicle for convenient manipulation by an operator walking alongside. An adjustable hydraulic snubber also is provided to control brake application.

20 Claims, 5 Drawing Figures

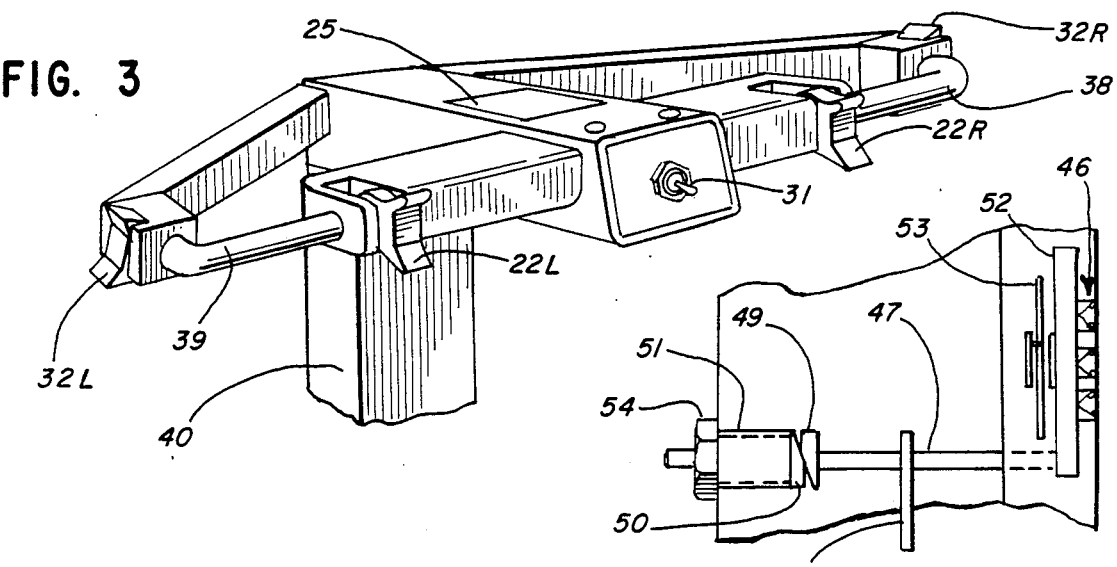
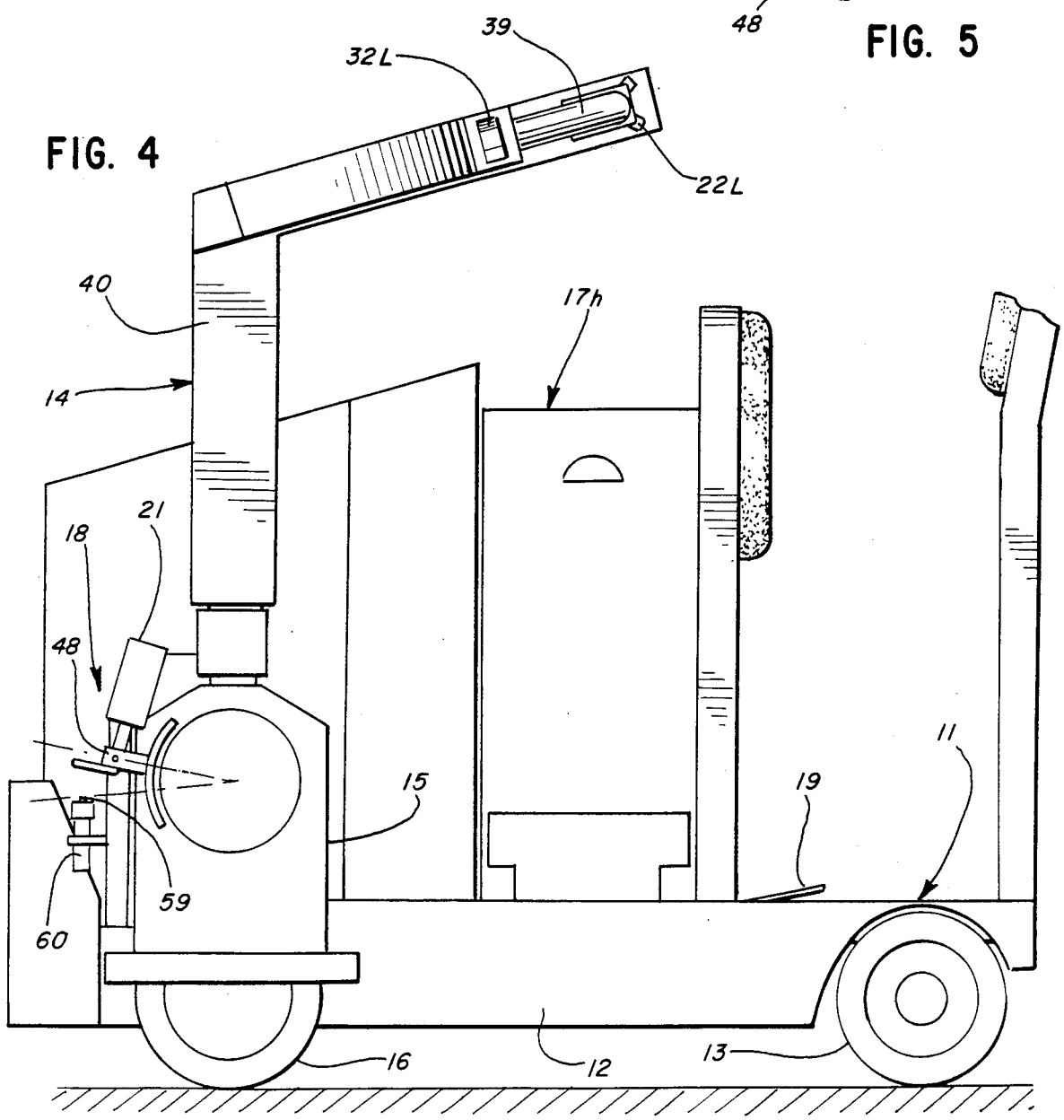

CONTROL SYSTEM FOR RIDER VEHICLES

BACKGROUND OF THE INVENTION

1. Field of the Invention

The present invention relates to vehicle control systems. More particularly, this invention relates to controls in electric vehicles of the types used as tow tractors or "tuggers" and low-lift transporters or "pallet trucks" and which are designed for use by an operator either riding or walking beside the vehicle, such as in filling or "picking" orders. Such vehicles are referred to herein generically as electric rider vehicles.

2. Description of the Prior Art

A variety of electric rider vehicles have been developed which also provide the capability for the operator to operate the machine from a walking position. Typically, the operator must attempt to utilize rider controls for machine movement while walking with the vehicle.

Such rider vehicles are commonly utilized in two different movement modes. One mode is for transport movement over a substantial distance, such as to or through a storage warehouse. In such operation, the vehicle usually is operated at higher speeds in order to allow a means of quick transportation of the rider, the vehicle and any payload. The other movement mode is when the operator is picking orders from warehouse storage. Upon location of a particular order component or part, the operator will step off the drive vehicle to "pick" the component from storage. When picking several components from the same general warehouse area, it may be advantageous for the operator to move the vehicle while walking alongside the vehicle, rather than remounting and driving.

The ability to operate the vehicle from the walking position is thus a desirable feature of such vehicles, for example where they are being used for "order picking." However, there is also a need for safety and control during that operation.

One safety feature is provided in such vehicles through the use of deadman controls. Deadman controls disable the propulsion power and apply the brakes on the drive vehicle in the absence of the operator's weight on the platform or a foot pedal. Safety can also be provided through speed limitations in the movement of the vehicle.

In an order picking movement mode, often it is preferable that the vehicle be capable of operator-free coasting for a short distance, e.g. three to six feet. This allows the operator who walks along the side of the vehicle to release the vehicle while in motion and to pick an order, then turn around and place the package on a cart which is being towed by the tractor or on a platform or pallet carried at the rear of the truck, e.g., on a low lift fork. The cart, platform or pallet is then beside the operator due to the intervening coasting movement. Similarly, following operation in the first movement mode, it may be advantageous for the operator to have the option of releasing the forward speed control while stepping off the machine at the desired order picking position. Ideally, the vehicle would then coast three to six feet, allowing the operator to pick the package and deposit the package on the cart which is then beside the operator. However, the utilization of deadman controls which apply the brake in the absence of an operator on the operator's platform eliminates the aforementioned features from conventional vehicles.

As a result of the practical needs of the order picker utilizing an electric rider vehicle, it is desirable that the drive vehicle be capable of multi-speed operation and yet be capable of providing a coasting mode to enable the operator to step off while picking orders and not cause the application of the deadman brake. Further, it is desirable to provide for control from a walking position, preferably with free-coasting capability, for the order picker who walks along beside the vehicle.

In some prior art vehicles attempts have been made to meet these needs by allowing operation of the rider handle controls from a walking position. However, many of these machines permit high travel speeds of the machine when operated from a walking position, which can present an undesirable operational hazard.

OBJECTS OF THE INVENTION

It is an object of this invention to provide an improved electric vehicle control system, and particularly to provide a system which meets the aforenoted needs.

It is a specific object of this invention to provide an improved vehicle control system which provides a coast control system to release the brake and also to allow forward and reverse movement by use of a jog switch operable from a walking position.

It is a further object of this invention to provide an improved vehicle control system that avoids the disadvantages and complexities of the prior art.

It is another object of this invention to provide a vehicle control system which limits the travel speed of the truck when operated from the walking position.

Other objects and advantages of the present invention will become apparent upon reading the following detailed description and appended claims, and upon reference to the accompanying drawings.

SUMMARY OF THE INVENTION

In accordance with one embodiment of this invention, an electric rider vehicle control system which achieves the foregoing objects includes a brake which is normally set to prevent coasting, and controls which release the brake and permit normal transport operation of the vehicle by an operator on the operator's platform. The controls also include a selector means for selecting between such normal operation and another mode in which the brake is held in a release position, at least the higher speed portions of the first controls are disabled or bypassed, and the propulsive drive may be operated by jogging controls mounted on the sides of the vehicle for convenient manipulation by an operator walking alongside. An adjustable hydraulic snubber also is provided to control brake application.

BRIEF DESCRIPTION OF THE DRAWINGS

For a more complete understanding of this invention, one should refer to the preferred embodiment illustrated in greater detail in the accompanying drawings and described below by way of an example of the invention. In the drawings:

FIG. 3 is a partial perspective view of the control column illustrating the rider controls, the coast control switches and the jog switch in the tractor of FIG. 1;

FIG. 4 is a schematic side view of the tractor of FIG. 1; and

FIG. 5 is a schematic illustration of the brake linkage of the tractor of FIG. 1.

DETAILED DESCRIPTION OF THE DRAWINGS

Figure 1:
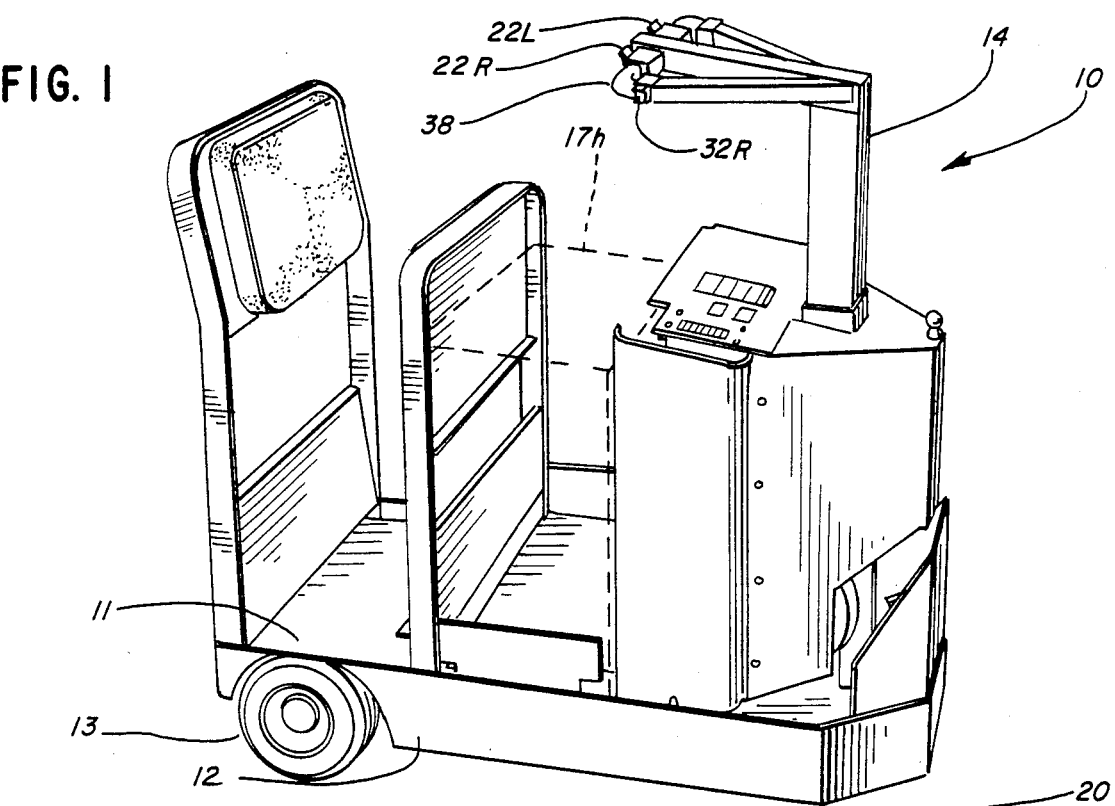
FIG. 1 is a perspective view of an electric tow tractor employing teachings of this invention, with the battery shown in phantom lines.

Turning now to the drawings, FIG. 1 shows an electric tow tractor vehicle generally at 10 with a rider-operator's platform 11. The general structure is shown in FIG. 1 and the schematic side view of FIG. 4. The vehicle 10 includes a frame 12, a pair of rear support wheels 13 and a transmission and handle assembly 14 which is pivotally mounted at the front of the vehicle. The latter assembly includes an electric propulsion motor and transmission 15 drive-connected to a drive wheel 16. Propulsion power is supplied by a storage battery 17 (FIG. 2) carried in a housing 17h. A "deadman" brake is provided in the transmission, generally at 18, which is spring biased to a normally brake-set position. The brake may be released upon the application of downward force on a foot pedal 19 to close a switch 20 (FIG. 2) which actuates an electrical solenoid 21.

In typical operation, the tractor 10 is used for order picking onto a towed trailer (not shown). An operator stands on the platform 11 and operates the vehicle in the normal rider operation mode. The operator drives the vehicle through a storage warehouse or similar area, stopping to select various items from storage shelves for filling orders.

The vehicle 10 is battery operated and a key switch 23 is provided to control its energization. To control normal forward and reverse movement of the vehicle in the rider operated mode, a motor controller system 24 is provided, as represented by the components encompassed within the box represented by dashed lines in FIG. 2. The controller system 24 includes a master control switch assembly which is mounted in the handle assembly 14, at 25, and affects the control circuitry. This control switch assembly 25 may be of a known type having multiple switch portions as represented by schematic switches 26, 27, 28 and 29 in FIG. 2. One such known forward/reverse control switch 26 effectively constitutes two independent single pole single throw switches for the forward and reverse control circuits and which are interlocked to prevent simultaneous completion of both the forward and reverse circuitry. Master switch assembly 25 also includes higher speed control switches 27, 28 and 29 interlocked for sequential operation. Right and left hand rocker-type switch actuator levers 22R and 22L are mounted on a common rocker shaft (not shown) for sequentially actuating all of the switches 26, 27, 28 and 29. Thus the actuators 22R and 22L are part of a single control for the master switch assembly 25, operable by either the right or left hand of the operator.

Figure 2:
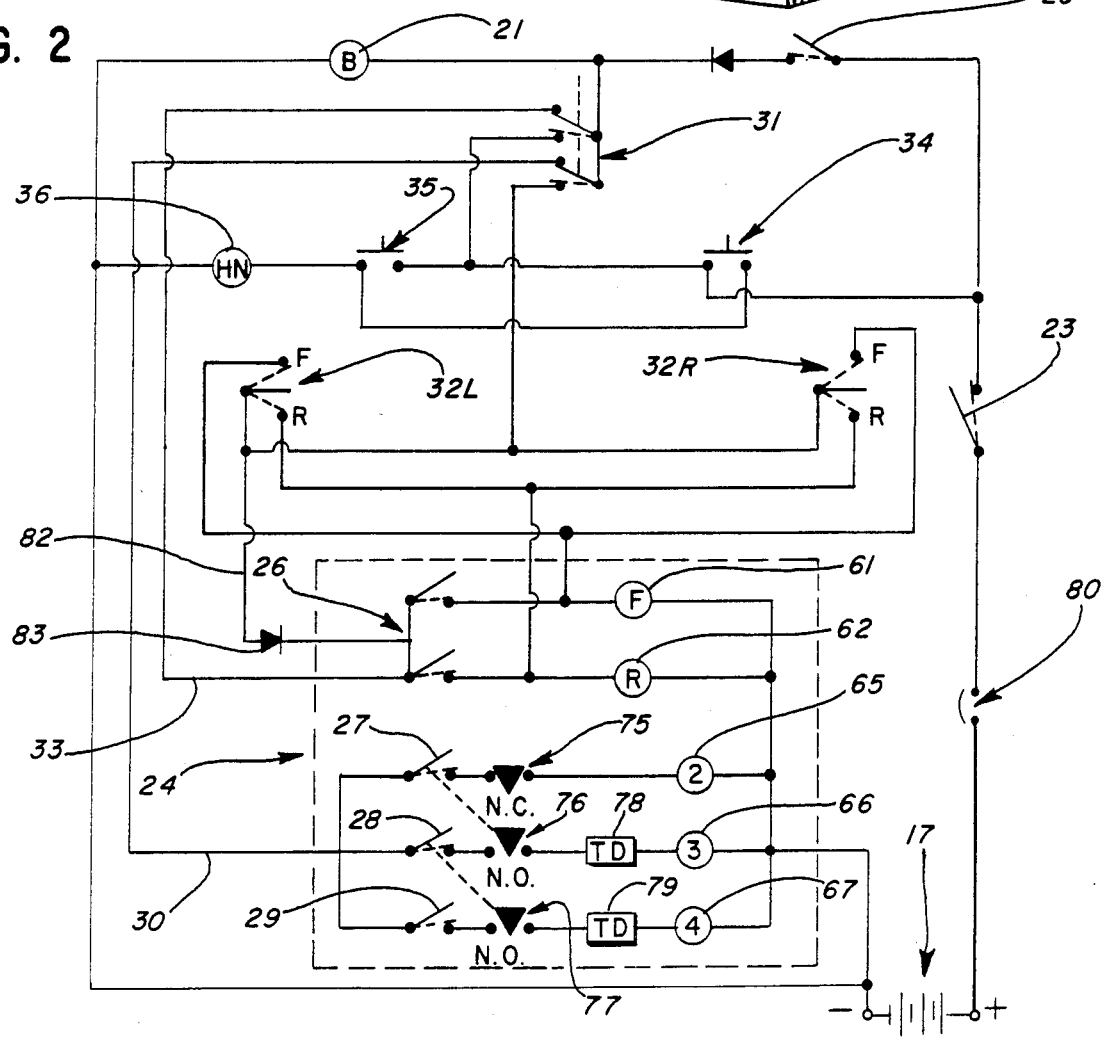
FIG. 2 is a schematic diagram of electrical control circuitry of the tractor of FIG. 1, and associated components.

The control circuitry is detailed in FIG. 2. It will be noted that the individual switches of the master switch 25 are connected to the control circuitry such that the speed control switches 27, 28 and 29 are activated by a circuit 30 which is isolated from the forward/reverse switch 26. The control system includes a selector switch 31 for selecting between the normal rider operator movement mode of operation utilizing the controls 19 and 25 at the rider's position on platform 11 and a separate walker-operator or "jogging" movement mode utilizing a second set of controls accessible at the side of the vehicle. In the second mode, at least the brake and speed controls of the first set of controls are bypassed in favor of the latter set. This second set of controls includes a pair of jog switches 32 and a brake release or bypass arrangement, as will be described further below.

In the normal rider operation, the battery 17 is connected in series with the key switch 23, brake switch 20 and brake solenoid 21. The closing of the key switch 23 provides power to the horn button switches 34, 35, the horn 36 and the brake switch 20. Closing of the brake switch 20 then provides power to the controller system 24 through the circuit 30 to the higher speed control switches and a circuit 33 to the forward/reverse-low speed switch 26. This normal rider operation occurs when the double-pole, double-throw selector switch 31 is in the "up" or "BRAKE" position of FIGS. 2 and 3. In this position, the switch 20 controls the power to the controller system 24 and to the brake solenoid 21, so that the vehicle may be operated only when the pedal 19 is depressed. The controller then provides bi-directional, multi-speed operation by an operator standing on platform 11.

To control steering, handles 38, 39 are manipulated to rotate the assembly 14. This movement affects the rotational movement of the vertical control column 40 which is connected directly to the electric motor and the front wheel. As shown in FIG. 4, the vertical column 40 is located generally along the vertical center line of the front wheel 16.

In order to initiate movement of the truck 10, the operator must affect the release of the brake from the normally set position and complete the power circuits to the controller 24. The normally set position is the result of the deadman control which causes the brake to set when the operator leaves the foot pedal 19. The application and maintenance of pressure on the foot pedal 19 causes the closing of the brake switch 20 to release the brake by activating solenoid 21 and to complete the power circuits to the controller 24.

The brake mechanism and related linkage is illustrated schematically in FIGS. 4 and 5. The internal brake springs 46 normally bias the brake to the set position and hold the brake in that position except when the release mechanism is actuated. The release mechanism comprises a push rod 47 on which are mounted an actuating lever 48 and a cam 49. The cam mates with a cam 50 which is affixed to the transmission housing by an adjustable mounting 51.

Closing the switch 20 serves to energize the brake solenoid 21. The energized solenoid 21 moves the brake lever 48 to rotate the rod 47 and thus rotates the attached cam 49 over cam 50 whereby the brake lever 52 is moved against the force of the compression springs 46 to release the brake disc 53 and hold the brake in the "OFF" or release position against the internal brake springs as shown in FIG. 5. Thus, with the solenoid 21 energized, the brake is held from application. When the foot pedal 19 is released, opening the brake switch 20, the solenoid 21 is deenergized and the brake levers 48 and 52 snap to the set position as a result of the force of the brake springs 46. An internal return spring also may be provided in the solenoid to assist in this return to the set position. An adjustment nut 54 permits adjustment of the brake rod and hence of the brake.

When the brake is in the release position as in FIG. 5, the snubber pin 59 of a hydraulic snubber 60 is in the extended position. The snubber is a hydraulic cushioning or damping mechanism, such as a dashpot assembly with a return spring, with the pin 59 extending from the piston. Upon deactivation of the solenoid 21, the brake actuating lever 48 engages and pushes against the snubber pin 59 which reduces the speed of the travel of the brake lever 48 as it travels to the set position. The utilization of the snubber in this manner results in a more gradual or softer application of the brake. When the brake is released, the brake lever 48 moves away from the snubber pin 59, allowing the snubber pin to extend and move to a position for utilization during the next brake setting cycle.

As noted above, normal rider operation of the vehicle in the transport mode occurs with selector switch 31 in the normal or "BRAKE" position, i.e., the upper position of the switch 31 shown in FIGS. 2 and 3. In this mode, after the brake is released, forward and reverse movement is controlled through switch levers 22R and 22L to operate the control switches 26, 27, 28 and 29. Appropriate movement of the switch levers selectively positions switch 26 to connect the forward control circuitry such as through forward drive contractor control coil 61 or the reverse control circuitry such as through a contractor control coil 62. Higher forward speeds are also available in normal rider operation through actuation of second speed control coil 65, third speed control coil 66 and fourth speed control coil 67 of the control circuitry. In the illustrated controller system 24, the circuits to these coils are connected through second speed control switch 27, third speed control switch 28 and fourth speed control switch 29, and second speed interlock 75, third speed interlock 76 and fourth speed interlock 77. The switches 27, 28 and 29 may be successive contact positions of the forward control switch mechanism actuated by the levers 22, and are connected in series with the respective interlocks 75, 76 and 77 and the speed control circuitry as illustrated in FIG. 2. The second speed interlock 75 is normally closed, while the third speed interlock 76 and fourth speed interlock 77 are each normally open. The second speed interlock 75 is interconnected to the reverse circuitry so that the interlock will open when the reverse circuitry is activated, to prevent reverse drive except at the lowest speed. The third and fourth speed interlocks are interconnected to the second and third speed circuits, respectively, to close when the next lower speed circuit is activated. This arrangement together with time delay devices 78 and 79 insure that the various speed circuits are activated only in the proper succession. The fourth speed circuit typically is optional. A circuit breaker 80 is included as a protective device.

Thus, in the normal rider operation mode, the brakes are set and movement of the truck is prevented except when the operator presses the foot pedal 19. The operator can choose either forward or reverse, and a variety of speeds in the forward direction, in order to move the vehicle in its normal transport mode by depressing the pedal 19 and manipulating the actuator levers 22R, 22L.

When the selector switch 31 is shifted to the "COAST" position, i.e., the lower position shown in FIGS. 2 and 3, a control circuit is completed through the solenoid 21 to place and maintain the brake in a release position. Also, power is supplied to the jog switches 32R and 32L, which are connected to the forward and reverse circuits as illustrated, to selectively actuate the forward and reverse contractor coils 61 and 62. Each switch 32 is a rocker switch which is spring loaded to a normal "off" position but can be pushed in either of two directions to selectively complete a forward propulsion circuit or a reverse propulsion circuit as illustrated. These switches also can be used for braking the vehicle when it is moving in this mode simply by actuating the switch in the opposite direction to "plug" the D.C. drive motor. Optionally, a circuit 82 including a diode 83 also may be provided between the power supply circuit to the jog switches 32 and the forward/reverse switch 26, as shown in FIG. 2. The circuit 82 permits operation of the vehicle from the rider position also, using actuators 22 and thus switch 26, while the second mode of operation is selected. However, with or without that circuit 82, it will be seen that the higher speed controls are bypassed and are not activated when this mode of operation is selected. Only the first and lowest speed of propulsion drive is available through the jog switches 32 or through the actuators 22 and switch 26 in this mode. That speed preferably is about 3.5 MPH, a comfortable walking speed for most persons.

The switches 32R and 32L are mounted in the outboard ends of the handle assembly and thus at the sides of the vehicle, so that one will be accessible for convenient manipulative access by an operator walking alongside the vehicle on either side. Also, the operator may step onto the platform 11 and ride while operating the propulsion motor from that position without changing the selected operational mode.

Assuming initial operation by a rider operator in the first or "BRAKE" mode, once the rider operator has located a particular order, the operator can step-off the vehicle to pick the order and let the vehicle coast by first moving the selector switch 31 to the "COAST" position, for the second movement mode of the vehicle. Movement of the selector switch 31 to this position, as shown in dashed lines in FIG. 2, eliminates the need to close brake switch 20 in order to permit the vehicle to move. Once the switch 31 is moved to its "COAST" position, the operator may leave the platform 11 and the truck will continue to coast for a short distance before stopping, e.g., three to six feet, to bring the load carrying platform (pallet, bed or trailer) beside the dismounted operator. Further, the operator can operate the vehicle conveniently from a walking position alongside by manipulating the respective jog switch 32 as he or she walks to another article transfer site, or the rider can step on and ride using actuators 22 in the same mode, and then step off. The vehicle will move with the operator, and upon release of the jog switch or actuator 22 again will coast forward for a short distance before stopping, to again bring the load carrying platform beside the dismounted operator. A drag brake, time-delayed brake or other related control may be added to more positively limit the coasting movement in this second mode of operation if that is found desirable or necessary.

Thus, an electrical vehicle control system has been provided which meets the aforestated objects. The vehicle has a deadman brake control which automatically sets the brakes in normal transport operation. Normal operation allows forward movement in a number of speeds, and reverse movement. An improved braking system with a hydraulic snubber provides gradual brake application. A second mode of operation bypasses the deadman braking control and allows convenient control of low-speed operation of the vehicle from a walking position as well as, optionally, from a riding position.

While the particular embodiment shown in the drawings above is a tow tractor for pulling a trailer or cart, the invention also is applicable to low-lift pallet trucks and similar electrically powered vehicles where such dual modes of operation are advantageous, such as in order picking, restocking or other stop-and-go plus transport operations. Thus, while one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. An electric rider vehicle comprising: electrical propulsion means for propelling said vehicle, means for supporting a person in an operator's position on said vehicle, first control means disposed on said vehicle in said operator's position for manipulation by a person at said position for effecting operation of said propelling means in forward and reverse directions in a first mode of propulsive operation, second control means disposed on said vehicle in a position wherein it is accessible for manipulation by a person walking beside said vehicle for effecting operation of said propelling means in forward and reverse directions in a second mode of propulsive operation which is different from said first mode, and means for selecting between operation of said propelling means by said first control means in said first mode or said second control means in said second mode and precluding operation of said propelling means by the non-selected control means in the respective non-selected mode.

2. The invention as in claim 1 wherein said first control means permits operation of said propulsion means for propelling said vehicle at multiple speeds in said first mode and said selector means and said second control means preclude operation of said propulsion means for propelling said vehicle at the higher of said multiple speeds in said second mode.

3. The invention as in claim 2 wherein said selector means and said second control means limit propulsive operation of said propulsion means to the propelling of said vehicle at the lowest of said multiple speeds.

4. The invention of claim 3 wherein said selector means permits operation of said propulsion means by said first control means and said second control means at such lowest speed in said second mode.

5. An electric rider vehicle comprising: electrical propulsion means for propelling said vehicle, means for supporting a person in an operator's position on said vehicle, brake means for preventing coasting movement of said vehicle and means for normally positioning said brake means in a vehicle-braking position, first control means disposed on said vehicle in said operator's position for manipulation by a person at said position for effecting operation of said propelling means in a first mode of propulsive operation, said first control means including brake operating means for selectively positioning said brake means in a non-braking position in said first mode, second control means disposed on said vehicle in a position wherein it is accessible for manipulation by a person walking beside said vehicle for effecting operation of said propelling means in a second mode of propulsive operation which is different from said first mode, means for selecting between operation of said propelling means by said first control means in said first mode or said second control means in said second mode and precluding operation of said propelling means by the non-selected control means in the respective non-selected mode, and said selecting means including means for positioning said brake means in a non-braking position while said second control means is selected for operation of said vehicle in said second mode.

6. The invention of claim 5 wherein said brake operating means includes a movable operating member which is biased to a normal brake setting position and which must be held in the brake release position by the operator to affect propulsive operation of said vehicle.

7. The invention of claim 6 wherein said movable operating member is a foot pedal mounted at said position, and an electric control switch disposed to complete a circuit for affecting positioning of said brake means in a non-braking position.

8. The invention of claim 5 including means for damping the movement of said brake means to such vehicle-braking position.

9. The invention of claim 8 wherein said damping means is a hydraulic snubber.

10. An electric rider vehicle comprising: electrical propulsion means for propelling said vehicle, means for supporting a person in an operator's position on said vehicle, first control means disposed on said vehicle in said operator's position for manipulation by a person at said position for effecting operation of said propelling means in a first mode of propulsive operation, second control means disposed on said vehicle in a position wherein it is accessible for manipulation by a person walking beside said vehicle for effecting operation of said propelling means in a second mode of propulsive operation which is different from said first mode, said second control means comprising control switch actuators mounted on each side of said vehicle, means for selecting between operation of said propelling means by said first control means in said first mode or said second control means in said second mode and precluding operation of said propelling means by the non-selected control means in the respective non-selected mode.

11. An electric rider vehicle comprising: electrical propulsion means for propelling said vehicle, means for supporting a person in an operator's position on said vehicle, a control column adjacent said operator's position, first control means mounted on said control column and disposed in said operator's position for manipulation by a person at said position for effecting operation of said propelling means in a first mode of propulsive operation, second control means disposed on said vehicle in a position wherein it is accessible for manipulation by a person walking beside said vehicle for effecting operation of said propelling means in a second mode of propulsive operation which is different from said first mode, said second control means comprising control switches mounted on each side of said column, and means for selecting between operation of said propelling means by said first control means in said first mode or said second control means in said second mode and precluding operation of said propelling means by the non-selected control means in the respective non-selected mode.

12. The invention as in claim 11 wherein said column is movable and is connected to a wheel of said vehicle for steering of said vehicle by movement of said column.

13. An electric rider vehicle comprising: electrical propulsion means for propelling said vehicle, means for supporting a person in an operator's position on said vehicle, brake means for preventing coasting movement of said vehicle, means for normally positioning said brake means in a vehicle-braking position, and power means for selectively moving said brake means to a non-braking position, first control means disposed on said vehicle in said operator's position for manipulation by a person at said position for effecting operation of said propelling means in a first mode of propulsive operation, said first control means including operating means for selectively actuating said power means to move said brake means to a non-braking position, second control means disposed on said vehicle in a position wherein it is accessible for manipulation by a person walking beside said vehicle for effecting operation of said propelling means in a second mode of propulsive operation which is different from said first mode, means for selecting between operation of said propelling means by said first control means in said first mode or said second control means in said second mode and precluding operation of said propelling means by the non-selected control means in the respective non-selected mode, and wherein said selecting means includes means for actuating said power means for positioning said brake means in a non-braking position when said second control means is selected.

14. The invention of claim 13 including means for damping the movement of said brake means to such vehicle-braking position.

15. The invention of claim 14 when said damping means is a hydraulic snubber.

16. An electric rider vehicle comprising: a frame, support wheels including at least one drive wheel which is steerable about a vertical axis for steering said vehicle, electrical propulsion means drive-connected to said wheel for propelling said vehicle, brake means and means normally setting said brake in a braking position for preventing coasting movement of said vehicle, an operator's platform on said frame for supporting an operator on said vehicle, a movable steering column disposed adjacent said platform and connected to said steerable drive wheel for steering said wheel by movement of said column by an operator, first control means mounted on said column for manipulation by an operator on said platform for operation of said propulsion means for propelling said vehicle at multiple speeds in a first mode of propulsive operation, electrical power means for selectively moving said brake means to a non-braking position, first actuating means on said vehicle for actuating said power means in response to the presence of an operator on said platform, second control means mounted on the side of said control column for manipulation by a person walking beside said vehicle for affecting operation of said propulsion means in a second mode of propulsive operation, and means for selecting between either operation of said propulsion means by said first control means in said first mode or said second control means in said second mode and precluding operation of said propelling means by the non-selected control means in the respective non-selected mode, and second means for actuating said power means to position said brake means in a non-braking position when said second control means is selected for operation of said vehicle in said second mode.

17. The invention as in claim 16 wherein said actuating means is a foot pedal.

18. The invention as in claim 17 including a switch in a power circuit to said propulsion means and actuated by said foot pedal between a circuit completing position when said pedal is depressed and an open position when said pedal is released.

19. The invention as in claim 16 wherein said second control means comprise a jog switch on each side of said control column and connected for controlling electrical power to said electrical propulsion means in said second mode of operation.

20. The invention as in claim 16 wherein said first control means includes first circuit means for operating said propelling means at a first speed and second circuit means for operating said propelling means at at least a second speed which is higher than said first speed, and said selecting means includes means for activating said first circuit means and activating said second control means and activating said second actuating means and de-activating said second circuit means in said second mode.

* * * * *

UNITED STATES PATENT AND TRADEMARK OFFICE
CERTIFICATE OF CORRECTION

PATENT NO. : 4,716,980

DATED : January 5, 1988

INVENTOR(S) : Robert W. Butler

It is certified that error appears in the above-identified patent and that said Letters Patent is hereby corrected as shown below:

Column 5, lines 20, 22 and 65, in each occurrence, "contractor" should read -- contactor --.

Signed and Sealed this

Nineteenth Day of July, 1988

Attest:

DONALD J. QUIGG

Attesting Officer          Commissioner of Patents and Trademarks